(12) United States Patent
Pang et al.

(10) Patent No.: US 9,670,843 B2
(45) Date of Patent: Jun. 6, 2017

(54) SYSTEM AND METHOD FOR HEATING A CATALYST IN AN EXHAUST TREATMENT SYSTEM OF A TURBINE ENGINE

(71) Applicant: General Electric Company, Schenectady, NY (US)

(72) Inventors: Raymond Pang, Schenectady, NY (US); Parag Prakash Kulkarni, Niskayuna, NY (US); Huijuan Chen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 467 days.

(21) Appl. No.: 14/089,728

(22) Filed: Nov. 25, 2013

(65) Prior Publication Data

US 2015/0143811 A1  May 28, 2015

(51) Int. Cl.
*F02C 6/18* (2006.01)
*F01N 3/20* (2006.01)
*F01N 5/02* (2006.01)

(52) U.S. Cl.
CPC .............. *F02C 6/18* (2013.01); *F01N 3/20* (2013.01); *F01N 3/206* (2013.01); *F01N 3/2066* (2013.01); *F01N 5/02* (2013.01)

(58) Field of Classification Search
CPC .......... F02C 6/18; F01N 3/2066; F01N 3/206; F01N 3/20; F01N 5/02
USPC .............................. 60/299, 300, 39.5, 39.511
See application file for complete search history.

(56) References Cited

U.S. PATENT DOCUMENTS

| | | | | |
|---|---|---|---|---|
| 5,155,995 A | * | 10/1992 | Kinnear | F01N 3/2013 123/179.2 |
| 6,055,803 A | * | 5/2000 | Mastronarde | F22B 1/1815 60/39.182 |
| 7,500,349 B2 | * | 3/2009 | Althaus | F01D 25/305 60/39.511 |
| 8,881,530 B2 | | 11/2014 | Gulen et al. | |
| 9,322,295 B2 | | 4/2016 | Pang et al. | |
| 2009/0282803 A1 | * | 11/2009 | Bono | B01D 53/343 60/39.5 |
| 2010/0215558 A1 | * | 8/2010 | Kraemer | B01D 53/8656 423/239.1 |
| 2012/0102913 A1 | * | 5/2012 | Emani | F01K 17/02 60/39.182 |

* cited by examiner

Primary Examiner — Steven Sutherland
(74) Attorney, Agent, or Firm — Fletcher Yoder, P.C.

(57) ABSTRACT

A system includes a catalyst system having at least one catalyst to treat an exhaust gas from a gas turbine system, and a thermal storage system having at least one storage tank to store thermal energy in a medium, wherein the system is configured to transfer heat from the medium to the at least one catalyst.

31 Claims, 3 Drawing Sheets

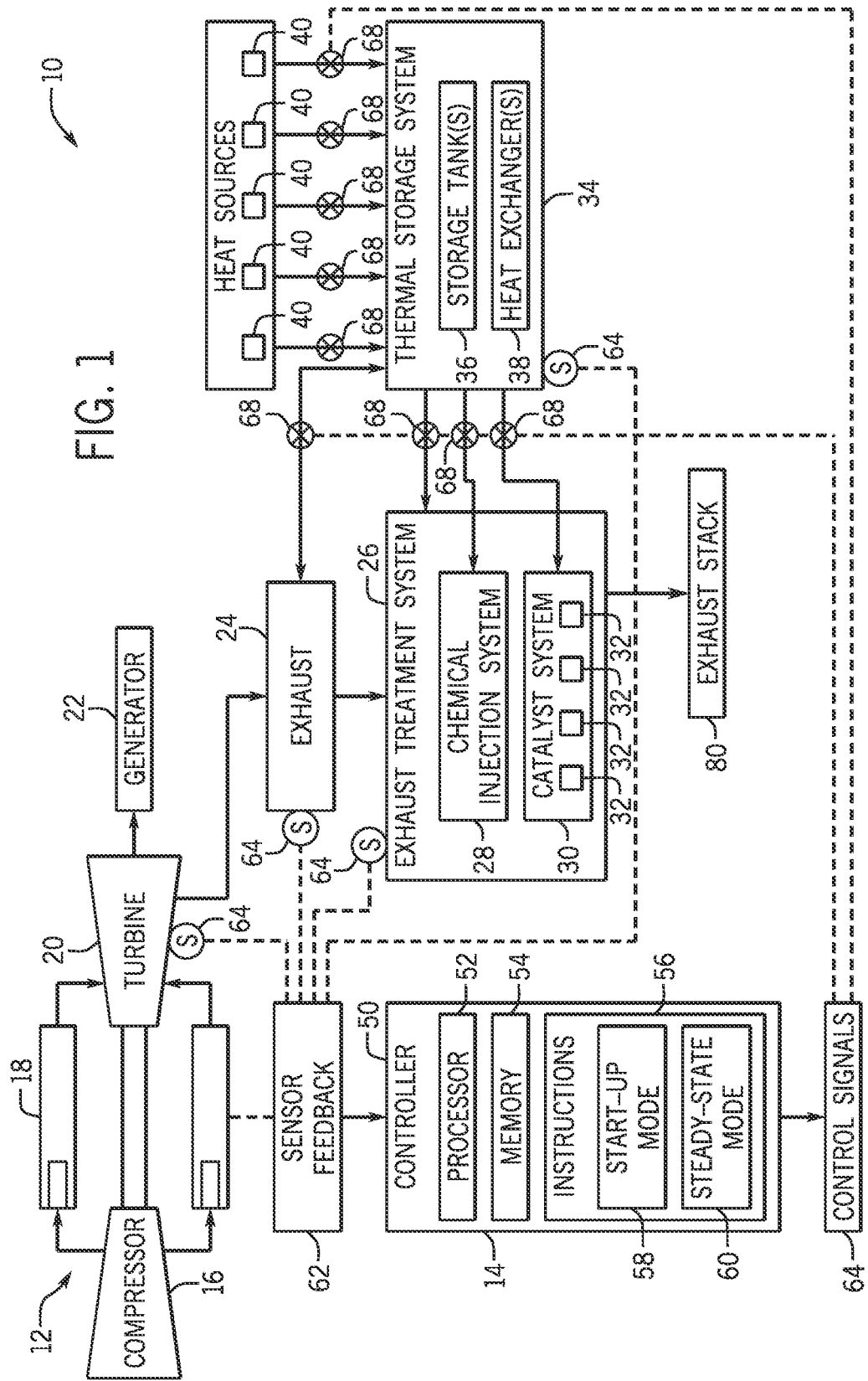

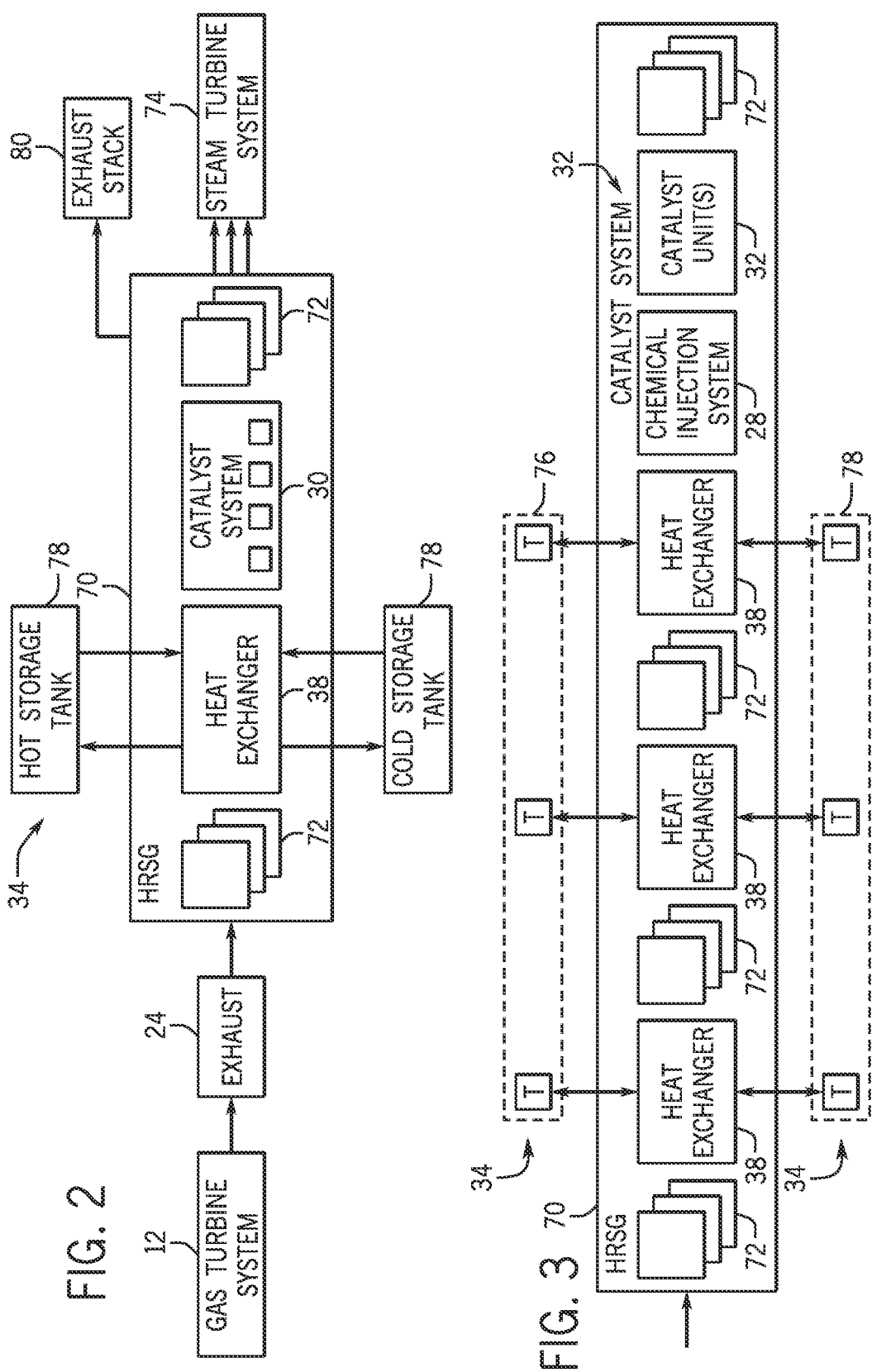

US 9,670,843 B2

SYSTEM AND METHOD FOR HEATING A CATALYST IN AN EXHAUST TREATMENT SYSTEM OF A TURBINE ENGINE

BACKGROUND

The subject matter disclosed herein relates to thermal power plants and, more particularly, exhaust treatment systems for turbine engines.

Various combustion systems, such as gas turbine engines, combust a mixture of air and fuel to produce hot combustion gases. These combustion gases include various emissions, such as nitrogen oxides (NOx), carbon monoxide (CO), sulfur oxides (SOx), and unburnt hydrocarbons. In general, it is desirable to lower the concentration of these emissions in the exhaust gas. For example, a catalyst may be used to increase a rate of a chemical reaction to convert these emissions into more desirable components. However, the catalyst may be less efficient at lower temperatures, such as during startup of the combustion system (e.g., gas turbine engine). As a result, during these periods of lower temperature (e.g., startup), the exhaust may have higher concentrations of the emissions. In general, regulatory standards create pressure to reduce emissions during off-design conditions such as start-ups and shut downs.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a catalyst system having at least one catalyst to treat an exhaust gas from a gas turbine system, and a thermal storage system having at least one storage tank to store thermal energy in a medium, wherein the system is configured to transfer heat from the medium to the at least one catalyst.

In a second embodiment, a system includes a controller having a processor, a memory, and instructions stored on the memory and executable by the processor. The instructions include instructions to control heat transfer from a heat source to a medium for storage of thermal energy in at least one storage tank of a thermal storage system, and instructions to control heat transfer from the medium to at least one catalyst of a catalyst system to treat an exhaust gas from a gas turbine system.

In a third embodiment, a method includes controlling heat transfer from a heat source to a medium for storage of thermal energy in at least one storage tank of a thermal storage system and controlling heat transfer from the medium to at least one catalyst of a catalyst system to treat an exhaust gas from a gas turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a schematic diagram of an embodiment of a gas turbine system with an exhaust treatment system, a thermal storage system, and a controller configured to control heat transfer between the thermal storage system and the exhaust treatment system;

FIG. 2 is a schematic diagram of an embodiment of a combined cycle system with a gas turbine system, a steam turbine system, a heat recovery steam generator (HRSG) having an exhaust treatment system, and a thermal storage system;

FIG. 3 is a schematic diagram of an embodiment of a thermal storage system and HRSG with multiple heat exchangers and a catalyst system of an exhaust treatment system;

DETAILED DESCRIPTION

Figure 4:
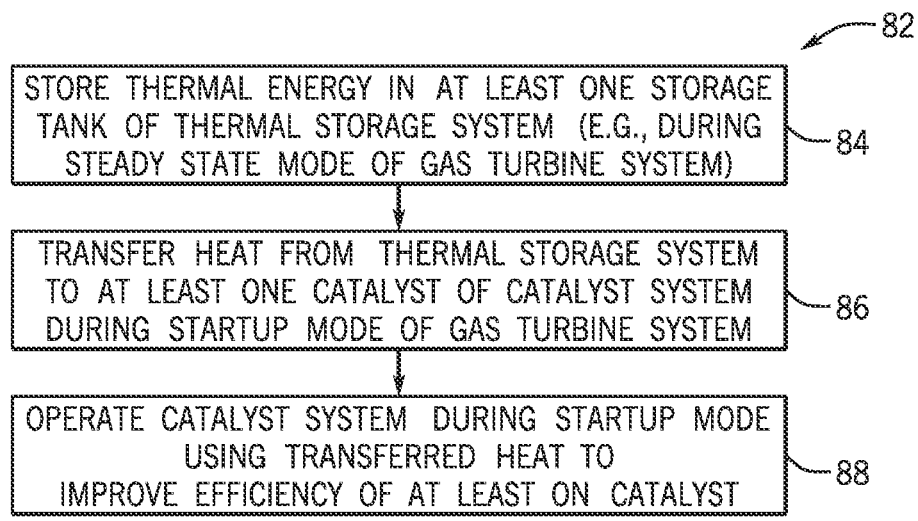
FIG. 4 is a flowchart of an embodiment of a process to operate a gas turbine system involving transferring heat between a thermal storage system and a catalyst system of an exhaust treatment system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to exhaust treatment systems having a catalyst system, wherein a thermal storage system is used to store heat for later use in heating a catalyst in the catalyst system during periods of low temperature (e.g., during startup). As discussed in detail below, combustion systems (e.g., gas turbine engines) generate exhaust gas with varying levels of emissions, such as nitrogen oxides (NOx), carbon monoxide (CO), sulfur oxides (SOx), and unburnt hydrocarbons. A catalyst system may include a catalyst to convert these emissions into more desirable components. For example, selective catalytic reduction (SCR) may be used to convert NOx into nitrogen and water. Examples of SCR catalyst materials include, but are not limited to, vanadium, molybdenum, tungsten, zeolites, or any combination thereof. The efficiency of the catalyst may be dependent on the temperature of the catalyst bulk material and the temperature of the gas flow entering the catalyst, e.g., low efficiency at low temperature. As discussed in detail below, the disclosed embodiments provide a thermal storage system to capture and store heat for subsequent use in heating the catalyst to improve efficiency of the catalytic reaction. For example, the thermal storage system may transfer and store heat from the exhaust gas generated by the combustion system (e.g., gas turbine engine) during periods of steady state operation, and later use the stored heat to heat the catalyst and the gas flow entering the catalyst during periods of low temperature (e.g., during startup of the gas turbine engine). In this manner, the thermal storage system helps to increase the efficiency of the catalyst system during periods that would otherwise be inefficient, thereby helping to reduce the total emissions output over the lifetime of the combustion system.

FIG. 1 is a block diagram that illustrates an embodiment of a system 10 having a combustion system (e.g., a gas turbine system 12), a controller 14, an exhaust treatment system 26, and a thermal storage system 34 to help increase efficiency of the exhaust treatment system 26. As discussed below, the thermal storage system 34 operates to transfer and store heat generated by the gas turbine system 12 (e.g., from the exhaust gas) during steady state operation, and then later transfer the heat back to the exhaust treatment system 26 (e.g., catalyst material and the gaseous flow entering the catalyst) during cooler and/or startup periods to increase the efficiency of the exhaust treatment system 26. In order to achieve this thermal transfer and storage, the controller 14 may receive sensor feedback from the gas turbine system 12, exhaust treatment system 26, and thermal storage system 34 to monitor operations, exhaust emissions, catalyst temperatures, etc., while also transmitting control signals to the gas turbine system 12, exhaust treatment system 26, and thermal storage system 34 to help control the emissions levels. Thus, the controller 14 may have a steady state operational mode that controls the thermal storage system 34 to store heat from the exhaust gas, and a startup operational mode that controls the thermal storage system 34 to transfer the stored heat back to the exhaust treatment system 26.

The gas turbine system 12 includes a compressor section 16, a combustion section 18, and a turbine section 20. The compressor section 16 compresses gas (e.g., oxidant such as air), which is subsequently mixed with fuel (e.g., liquid and/or gas fuel) and combusted in the combustor section 18 to generate hot combustion gases. The combustion gases drive the turbine 20 (e.g., 1, 2, 3, 4, 5, or more turbine stages each having a plurality of turbine blades coupled to a rotor) and one or more loads, such as an electrical generator 22. The gas turbine system 12 outputs the hot combustion gases as an exhaust 24 (or exhaust gas), which includes various exhaust emissions such as NOx, CO, SOx, and unburnt hydrocarbons.

These exhaust emissions may be subject to various regulatory requirements, and thus the exhaust treatment system 26 helps to maintain levels of these exhaust emissions within the regulatory requirements (e.g., below certain emissions levels). While shown as separate and downstream of the turbine 20, the exhaust treatment system 26 may include sensors and components disposed within the compressor 16, the combustor 18, the turbine 20, or any combination thereof. For example, the exhaust treatment system 26 may include temperature sensors, gas composition sensors, flow sensors, flame sensors, fuel sensors, oxidant sensors, or any combination thereof. By further example, the gas composition sensors may include oxygen sensors, NOx sensors, CO sensors, SOx sensors, unburnt hydrocarbon sensors, or any combination thereof. These gas composition sensors may help the exhaust treatment system 26 to make adjustments to improve the efficiency of its emissions removal processes and systems, such as a chemical injection system 28 and a catalyst system 30.

The chemical injection system 28 of the exhaust treatment system 26 injects chemicals (e.g., reducing agents) into the exhaust 24 to increase the rate of reactions that convert or reduce emissions in the exhaust into other components. For example, the chemical injection system 28 may inject ammonia ($NH_3$) or urea into the exhaust 24, thereby helping to drive a reduction reaction to reduce the NOx into $N_2$ and water. The chemical injection system 28 may include a grid or array of nozzles that inject the chemicals into the exhaust 24. The controller 14 may adjust (e.g., increase or decrease) the flow of chemicals into the exhaust 24 depending on the feedback from sensors, e.g., increase chemical flow if sensor feedback indicates higher NOx emissions or decrease chemical flow if sensor feedback indicates lower NOx emissions. In addition, the chemical injection system 28 may cooperatively reduce emissions (e.g., NOx) along with the catalyst system 30, which also helps to increase the rate of the reduction reaction within the exhaust treatment system 26.

The catalyst system 30 of the exhaust treatment system 26 may include one or more catalysts 32 placed in one or more locations throughout the system 10 as described with regard to FIG. 3. The catalysts 32 may include oxidation catalysts and/or reduction catalysts, such as selective catalytic reduction (SCR) catalyst materials. These SCR catalysts 32 may be used to convert NOx into nitrogen and water. Examples of SCR catalysts 32 include, but are not limited to, vanadium, molybdenum, tungsten, zeolites, or any combination thereof. Other catalysts 32 may include precious metals, such as platinum, palladium, and rhodium. Further examples of the catalysts 32 include cerium, iron, manganese, and nickel. In certain embodiments, the catalyst system 30 may include a plurality of catalyst units or sections disposed in parallel and/or in series relative to one another along the flow of exhaust 24. These catalyst units may be the same or different from one another, and thus each catalyst unit may have different temperature ranges (e.g., upper and lower temperature thresholds) that increase their efficiencies in removing emissions from the exhaust 24. Certain embodiments of the catalysts 32 of the catalyst system 30 may be more effective (i.e., higher efficiency) when the temperatures of the exhaust 24 and/or the catalyst 32 are above certain temperature thresholds, e.g., greater than approximately 150, 200, 250, 300, 350, or 400 degrees Celsius. For example, these temperatures may correspond to the temperature of the exhaust 24 from the turbine 20 during steady stage operation. Unfortunately, without the disclosed thermal storage system 34, the catalyst 32 may begin at room temperature (e.g., 0 to 40 degrees Celsius) during startup of the gas turbine system 12, and the temperature of the catalyst 32 may not heat up very quickly as the exhaust 24 passes through the catalyst system 30. As a result, without the disclosed thermal storage system 34, the emissions levels (e.g., NOx emissions levels) may be higher during startup periods of the gas turbine system 12.

In order to increase the temperature of the catalysts 32 during startup and concurrently improve efficiency of the catalyst system 30 and the entire exhaust treatment system 26, the controller 50 is used to control the thermal storage system 34 to store heat during steady state operation of a first or second gas turbine system 12 and subsequently transfer the stored heat to the catalysts 32 and the gas flow entering the catalyst during startup of the first or second gas turbine system 12. In other words, the thermal storage system 34 may both store heat from a specific turbine system 12 and then return the heat to the catalyst system 30 for treating exhaust 24 from that same turbine system 12, or the thermal storage system 34 may store heat from a first turbine system 12 (or first combustion system) and then return the heat to the catalyst system 30 for treating exhaust 24 from a different second turbine system 12 (or second combustion system). In order to effectuate this heat storage and transfer, the thermal storage system 34 may store heat in one or more thermal storage tanks 36 and/or transfer heat via one or more heat exchangers 38. The thermal storage tanks 36 may include any suitable thermal storage medium, such as molten salt, oil, water, a solid, a liquid, or any combination thereof. The heat exchangers 38 may include multiple components and/or heat exchanging mediums before thermal energy is conveyed to the thermal storage medium. For example, the heat exchangers may include water/steam transfer components that first absorb heat energy from the exhaust before conveying the heat to the thermal storage medium for storage within the thermal storage tanks 36. The thermal storage tanks 36 also may include insulated vessels, phase change materials, or any combination thereof. The storage tanks 36 may store heat from one or more heat sources 40, such as the heat of combustion present in the exhaust 24 during a steady state mode of the system 10 (e.g., after startup is complete). The heat sources 40 also may include any suitable heating process, such as a solar collector, a steam supply, a heated water supply, a heated gas supply, a heated liquid supply, a furnace, a combustion system, a reactor, a gasifier, a gas treatment unit, or any combination thereof. The thermal storage system 34 may also store heat that is extracted from the exhaust 24 from 1, 2, 3, 4, 5, or more gas turbine systems 12, one or more of the heat sources 40, or any combination thereof, during operation of the system 10. That is, rather than using one of the heat sources 40, the storage tanks 36 may draw heat from any number of heat sources 40. Furthermore, the heat exchangers 38 may be used to transfer heat from the heat sources 40 into the storage tanks 36 and/or the heat exchangers 38 may be used to transfer heat from the storage tanks 36 into the exhaust treatment system 26 (e.g., catalysts 32, gas flow entering the catalyst or other parts of the exhaust treatment system).

The illustrated embodiment of the system 10 also includes a controller 50 (e.g., a single controller or distributed network of controllers) having one or more processors 52 and memory 54 including non-transitory readable media storing code or instructions 56 executed by the processor 52. The instructions 56 include different programmed operational modes, such as a startup mode 58 and a steady-state mode 60 of operation of the system 10 (e.g., including the thermal storage system 34 and the exhaust treatment system 26). The controller 50 receives sensor feedback 62 from sensors 64 placed throughout the system 10, thereby facilitating control of the thermal storage system 34 and exhaust treatment system 26 to help reduce emissions. In the illustrated embodiment, the sensors 64 are placed within the turbine 20, the exhaust treatment system 26, the thermal storage system 34, and in areas that monitor the exhaust 24. In other embodiments, the sensors 64 may be placed in other areas of the system 10 to monitor other operations. For example, the sensors 64 may include temperature sensors (e.g., exhaust 24 temperature sensors, catalyst 32 temperature sensors, heat source 40 temperature sensors, and tank 36 temperature sensors), flame sensors in combustors of the gas turbine system 12, fuel composition sensors, flow rate sensors (e.g., fuel flow sensors and exhaust 24 flow sensors), gas composition sensors (e.g., $O_2$ sensors, NOx sensors, CO sensors, SOx sensors, unburnt hydrocarbon sensors), or any combination thereof. The sensor feedback 62 from these sensors 64 enables the controller 50 to provide suitable control signals 66 throughout the system 10, such as control signals 66 to adjust (e.g., open or close) heat transfer components 68 (e.g., valves, pumps, flow restrictors or regulators, pressure regulators) between the thermal storage system 34 and the heat sources 40 and exhaust treatment system 26.

During the steady-state mode 60, the controller 50 may execute the instructions 56 to send control signals 66 to open one or more of the valves 68 to enable heat transfer from the heat sources 40 to the thermal storage system 34, while also closing valves 68 to block heat transfer from the thermal storage system 34 to the exhaust treatment system 26. This heat transfer from the heat sources 40 to the thermal storage system 34 may occur via direct heat transfer or indirect heat transfer. For example, the heat exchangers 38 may include direct and/or indirect heat exchangers 38 to transfer the heat from the heat sources 40 to the storage tanks 36. In certain embodiments, each heat source 40 may provide heat to a medium stored in one or more storage tanks 36, and the controller 50 may independently control the valves 68 to control this heat transfer for storage at similar or different temperatures. For example, each storage tank 36 may be used for the same or different catalysts 32 (or catalyst sections) in the catalyst system 30, wherein each catalyst 32 may have the same or different temperature thresholds that are helpful in increasing efficiency of the catalyst 32. Thus, the thermal storage system 34 may capture and store a substantial amount of thermal energy for later use by the exhaust treatment system 26.

During the startup mode 58, the controller 50 may execute the instructions 56 to send control signals 66 to close one or more of the valves 68 to block heat transfer from the heat sources 40 to the thermal storage system 34, while also opening one or more valves 68 to enable heat transfer from the thermal storage system 34 to the exhaust treatment system 26. This heat transfer from the thermal storage system 34 (e.g., tanks 36 and/or heat exchangers 38) to the exhaust treatment system 26 may occur via direct heat transfer or indirect heat transfer. For example, the heat exchangers 38 may include direct and/or indirect heat exchangers 38 to transfer the heat from the tanks 36 to the catalysts 32 in the catalyst system 30 of the exhaust treatment system 26. In certain embodiments, each tank 36 and/or heat exchanger 38 may provide heat to one or more catalysts 30 (or catalyst sections), and the controller 50 may independently control the valves 68 to control this heat transfer for heating the catalysts 34 to similar or different temperatures prior to or during startup of the gas turbine system 12. For example, each tank 36 and/or heat exchanger 38 may be used for pre-heating the same or different catalysts 32 (or catalyst sections) in the catalyst system 30 to temperatures within one or more temperature ranges, e.g., a first catalyst temperature range, a second catalyst temperature range, and a third catalyst temperature ranges. Thus, the thermal storage system 34 may help transfer a substantial amount of thermal energy for pre-heating the catalysts 32 to enable the exhaust treatment system 26 to perform efficiently during all or substantially all of a startup cycle of the gas turbine system 12.

FIG. 2 is a schematic diagram of an embodiment of the system 10 with the gas turbine system 12, a steam turbine system 74, a heat recovery steam generator (HRSG) 70 having the exhaust treatment system 26, and the thermal storage system 34 with multiple storage tanks 36. In certain embodiments, the system 10 may include a combined cycle power plant (CCPP), such as an integrated gasification combined cycle (IGCC) power plant having a gasifier to generate a syngas from a carbonaceous feedstock (e.g., coal), the gas turbine system 12 driven by the syngas, the HRSG 70 to generate steam from the gas turbine exhaust 24, and the steam turbine system 74 driven by the steam. In addition, the system 10 may include any number of gas turbine systems 12 (e.g., 1, 2, 3, 4, or more), any number of HRSGs 70 (e.g., 1, 2, or more), any number of steam turbine systems 74 (e.g., 1, 2, 3, 4, or more), any number of exhaust treatment systems 26 (e.g., 1, 2, 3, or more), and any number of thermal storage systems 34 in various parallel and/or serial configurations.

In the illustrated embodiment, the HRSG 70 includes, or couples to, the thermal storage system 34 and the exhaust treatment system 26, which includes the catalyst system 30 and may also include the chemical injection system 28. The HRSG 70 also includes various HRSG components 72 configured to generate steam 73 (e.g., low, intermediate, and high pressure steam) to drive the steam turbine system 74. For example, the components 72 may include one or more economizers, evaporators, superheaters, water preheaters, and steam drums. By further example, the components 72 may include a low pressure section, an intermediate pressure section, and a high pressure section, wherein each section has one or more of the foregoing components. As further illustrated, the thermal storage system 34 has one or more heat exchangers 38 (e.g., 1, 2, 3, 4, 5, or more) disposed upstream from the exhaust treatment system 26 (e.g., catalyst system 30), such that the thermal storage system 34 may be controlled to add heat upstream from the catalyst system 30 (e.g. into any parts of the component 72) to help increase the temperature of the catalysts 32 during cold periods and/or startup periods. The heat exchangers 38 may be disposed at any distance upstream and offset from, directly upstream and adjacent to, and/or directly coupled to the catalyst system 30 to facilitate heat transfer to the catalysts 32. In certain embodiments, one or more components 72 of the HRSG 70 may be disposed upstream, downstream, and/or between the heat exchangers 38 of the thermal storage system 34 and the catalyst system 30 of the exhaust treatment system 26. For example, the heat exchangers 38 of the thermal storage system 34 and the catalyst system 30 of the exhaust treatment system 26 may be disposed in a low pressure section, an intermediate pressure section, and/or a high pressure section of the HRSG 70.

As the exhaust 24 flows through the HRSG 70 during operation of the gas turbine system 12, the exhaust 24 flows across and/or through the heat exchangers 38 to facilitate heat transfer to the thermal storage system 34 prior to exiting through an exhaust stack 80. The exhaust 24 may also convey heat to water and/or steam which conveys the heat to the heat exchangers 38. Indeed, the heat exchangers 38 may include multiple steps and/or mediums (i.e., multiple gas/liquid heat transfer fluids) to convey the heat from the exhaust 24 to the heat exchangers 38 in the thermal storage system 34. The illustrated thermal storage system 34 includes one or more hot storage tanks 76 and one or more cold storage tank 78. Each tank 76, 78 is coupled to the heat exchangers 38 via conduits, such as hot tank conduits 75 and cold tank conduits 77. During and/or prior to startup of the gas turbine system 12, a heat transfer medium (e.g., molten salt, oil, water, solid, liquid, or any combination thereof) flows along a flow path from the hot storage tank 76 to the heat exchanger 38 via conduit 75, through the heat exchanger 38 to transfer heat from the heat transfer medium to the flow path through the HRSG 70, and then from the heat exchanger 38 to the cold storage tank 78 via conduit 77. As the heat exchanger 38 transfers heat from the medium (e.g., directly between exhaust and thermal storage medium or indirectly via a water/steam intermediate heat transfer step) to the flow path (e.g., exhaust flow path), the heat is also transferred to the catalyst system 30 of the exhaust treatment system 26, thereby helping to heat up the catalysts 32 to increase the efficiency of the catalytic reactions. Once the gas turbine system 12 completes the startup and the components 72 of the HRSG 70 have reached a steady state condition, the medium flows from the cold storage tank 78 to the heat exchanger 38 via conduit 77, through the heat exchanger 38 (including possible water/steam transfer steps) to transfer heat from the exhaust 24 to the heat transfer medium, and then from the heat exchanger 38 to the hot storage tank 76 via conduit 75. This transfer may also include intermediate steps such as water or steam to convey thermal energy. In addition, the thermal storage system 34 may circulate the heat transfer medium in a hot tank loop through the hot storage tank 76 and the heat exchanger 38 via a supply conduit 75 and a return conduit 75, thereby helping to maintain a temperature of the heat transfer medium above a temperature threshold. In some embodiments, the hot storage tank 76 and the cold storage tank 78 may be combined, such that the medium flows through the heat exchanger 38 and returns to the same tank.

FIG. 3 is a schematic diagram of an embodiment of the thermal storage system 34 and HRSG 70 with multiple heat exchangers 38 and the catalyst system 30 of the exhaust treatment system 26. For example, as viewed from left to right, one or more heat exchangers 38 are disposed upstream, downstream, and between a first set of components 72, a second set of components 72, a third set of components 72, and a fourth set of components 72 of the HRSG 70, wherein each set of components 72 may correspond to an HRSG section or stage (e.g., high, intermediate, and low pressure section). Again, each set of components 72 may include one or more economizers, evaporators, superheaters, water preheaters, and steam drums. In the illustrated embodiment, a first thermal storage system 34A (e.g., first heat exchanger 38, first hot storage tank 76, and first cold storage tank 78) is disposed downstream from a first set of components 72, a second thermal storage system 34B (e.g., second heat exchanger 38, second hot storage tank 76, and second cold storage tank 78) is disposed downstream from a second set of components 72, a third thermal storage system 34C (e.g., third heat exchanger 38, third hot storage tank 76, and third cold storage tank 78) is disposed downstream from a third set of components 72, the chemical injection system 28 is disposed downstream from the third thermal storage system 34A, and the catalyst system 30 is disposed downstream from the chemical injection system 28. In the illustrated embodiment, all three heat exchangers 38 are placed upstream of the catalyst system 30 and the chemical injection system 28. This enables the exhaust 24 to be heated before coming in contact with the catalysts 32, increasing efficiency of the reaction with the injected chemicals. In this staged configuration or distributed configuration of thermal storage heat exchangers 38, the heat transfer may have a lesser impact on the normal operation of the HRSG components 72 during steady state operation, while also helping to gradually heat up both the components 72 and the catalysts 32 during cold periods and/or startup periods of operation. In some embodiments, one or more of the heat exchangers 38 may be disposed directly upstream, directly adjacent, and/or directly coupled to the chemical injection system 28 and/or the catalyst system 30.

FIG. 4 is a flowchart of an embodiment of a process 82 to operate the gas turbine system 12 involving transferring heat between the thermal storage system 34 and the catalyst system 30 of the exhaust treatment system 26. The process 82 may be controlled by the controller 50 and begins, at block 84, with storing thermal energy in at least one storage tank 36 of thermal storage system 34 (e.g., during steady state mode 60 of gas turbine system 12). As mentioned above, storing thermal energy may be accomplished using a medium (e.g., molten salt) that absorbs heat from the exhaust 24 (perhaps via water, steam, or other intermediate medium) of the gas turbine system 12. The thermal energy may also be stored from any of the other heat sources 40 mentioned above. After thermal energy is stored, the process 82 includes, at block 86, transferring heat from the thermal storage system 34 to at least one catalyst 32 of the catalyst system 30 during the startup mode 58 of the gas turbine system 12, during cold periods, or at any time suitable to heat the catalysts 32. As described above, during startup of the gas turbine, the HRSG 70 may be relatively cool compared to the operating temperature during steady state conditions, and thus a significant amount of heat may be transferred from the exhaust 24 before reaching the catalysts 32. The process 82 raises the emissions removal efficiency by, at block 88, operating the catalyst system 30 during startup mode using transferred heat to improve efficiency of at least one catalyst 32. Transferring heat from the thermal storage system 34 to the catalysts 32 increases the catalyst efficiency and removes greater concentrations of unwanted emissions from the exhaust 24.

Figure 5:
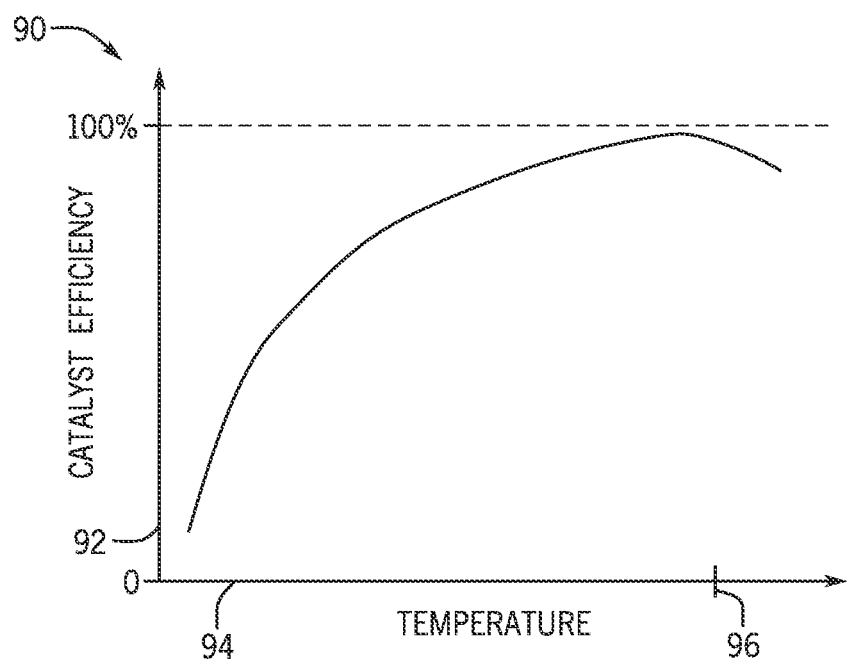
FIG. 5 is a graph of an embodiment of catalyst efficiency percentage as it relates to a temperature of an exhaust gas.

FIG. 5 is a graph 90 of an embodiment of catalyst efficiency percentage 92 as it relates to the temperature 94 of the exhaust gas 24. The abscissa 94 of the graph 90 shows the temperature of the bulk material of the catalyst 32. The ordinate 92 of the graph 90 shows the catalyst efficiency. Different catalysts 32 may perform better or worse under varying temperatures; therefore, the graph 90 does not show specific temperatures, only general tendencies of some embodiments of catalysts 32 that may be used within the catalyst system 34 within the HRSG 70. A catalyst 32 used for NOx removal, for example, may have an upper performance temperature 96 of greater than or equal to approximately 350, 375, 400, or 425 degrees Celsius. In other words, it may be desirable to preheat the catalyst 32 to a temperature at or above approximately 260, 350, or 400 degrees Celsius, or some other threshold temperature. However, the controller 50 may control the thermal storage system 34 to preheat the catalyst 32 above any suitable lower temperature threshold and/or within any suitable range between upper and lower temperature thresholds.

Technical effects of the invention include an exhaust treatment system 26 that lowers the amount of some types of emissions generated within a gas turbine system 12. The exhaust treatment system 26 includes the chemical injection system 28 and the catalyst system 30 that may be heated by the thermal storage system 34. The thermal storage system 34 heats a medium either by the external heat sources 40 and/or by transferring heat from the exhaust 24 of the gas turbine system 12 via heat exchangers 38 that may include multiple steps and/or mediums. Technical effects also include the controller 50 that controls the amount of heat transferred to and from the thermal storage system 34 based on signals received from various locations throughout the gas turbine system 12 and the HRSG 70. The controller 50 contains instructions that are different depending on whether the gas turbine system 12 is starting up or whether the gas turbine system 12 is running at a steady state. The startup mode instructions 58 may include instructions to transfer heat to the exhaust 24, while the steady state mode instructions 60 include instructions to transfer heat from the exhaust 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a catalyst system having at least one catalyst to treat an exhaust gas from a gas turbine system; and
    a thermal storage system having at least one storage tank to store thermal energy in a medium such that heat is available prior to a startup mode during a cold period of the gas turbine system, wherein the medium comprises a solid, a salt, an oil, or a liquid other than water, and the system is configured to transfer the heat from the medium to the at least one catalyst during the startup mode and the cold period of the gas turbine system.

2. The system of claim 1, wherein the system is configured to transfer heat from the medium directly to the catalyst system having the at least one catalyst.

3. The system of claim 1, wherein the system is configured to transfer heat to the medium during a steady state mode of the gas turbine system for later use during the startup mode and the cold period of the gas turbine system.

4. The system of claim 1, wherein the system is configured to transfer heat from the exhaust gas to the medium to store the thermal energy in the medium.

5. The system of claim 1, wherein the system is configured to transfer heat to the medium from a solar collector, a steam supply, a heated water supply, a heated gas supply, a heated liquid supply, a furnace, a combustion system, a reactor, a gasifier, a gas treatment unit, or any combination thereof, to store the thermal energy in the medium.

6. The system of claim 1, wherein the at least one catalyst comprises a nitrogen oxide (NOx) catalyst configured to remove NOx from the exhaust gas, a carbon monoxide (CO) catalyst configured to remove CO from the exhaust gas, or any combination thereof.

7. The system of claim 1, wherein the thermal storage system comprises at least one heat exchanger configured to mount in a path of the exhaust gas upstream from the at least one catalyst, and the at least one heat exchanger is configured to transfer heat from the medium to the exhaust gas or a part of a heat recovery steam generator upstream from the at least one catalyst.

8. The system of claim 7, wherein the at least one heat exchanger comprises water or steam to transfer heat from the medium to the exhaust gas.

9. The system of claim 1, comprising the gas turbine system configured to generate the exhaust gas.

10. The system of claim 1, comprising a heat recovery steam generator (HRSG) configured to generate a steam by transferring heat from the exhaust gas to water.

11. The system of claim 10, wherein the HRSG comprises the catalyst system.

12. The system of claim 11, comprising a steam turbine configured to be driven by the steam from the HRSG.

13. The system of claim 10, wherein the at least one storage tank is not directly associated with steam generation by the HRSG, and the at least one storage tank is disposed outside of the HRSG.

14. The system of claim 10, wherein the HRSG comprises one or more steam generating components, and the thermal storage system is independent from the one or more steam generating components of the HRSG.

15. The system of claim 1, wherein the at least one storage tank comprises a cold storage tank and a hot storage tank coupled to a common heat exchanger, and the common heat exchanger is configured to transfer heat to the at least one catalyst.

16. The system of claim 1, wherein the system is configured to transfer the heat from the medium to the at least one catalyst prior to the startup mode of the gas turbine system.

17. A system, comprising:
a controller having a processor, a memory, and instructions stored on the memory and executable by the processor, wherein the instructions comprise:
instructions to control heat transfer from a heat source to a medium for storage of thermal energy in at least one storage tank of a thermal storage system such that heat is available prior to a startup mode during a cold period of a gas turbine system; and
instructions to control heat transfer from the medium to at least one catalyst of a catalyst system to treat an exhaust gas from the gas turbine system during the startup mode and the cold period of the gas turbine system, wherein the instructions to control heat transfer from the medium to the at least one catalyst comprise instructions to control heat transfer from the medium directly to the catalyst system having the at least one catalyst.

18. The system of claim 17, wherein the medium comprises a solid, a salt, an oil, or a liquid other than water.

19. The system of claim 17, wherein the instructions to control heat transfer from the heat source to the medium for storage of thermal energy comprise instructions to control heat transfer to the medium during a steady state mode of the gas turbine system.

20. The system of claim 19, comprising the thermal storage system having the at least one storage tank and at least one heat exchanger configured to transfer heat to or from the exhaust gas.

21. A method, comprising:
controlling heat transfer from a heat source to a medium for storage of thermal energy in at least one storage tank of a thermal storage system such that heat is available prior to a startup mode during a cold period of a gas turbine system; and
controlling heat transfer from the medium to at least one catalyst of a catalyst system to treat an exhaust gas from the gas turbine system during the startup mode and the cold period of the gas turbine system, wherein controlling heat transfer from the medium to the at least one catalyst comprises controlling heat transfer from the medium directly to the catalyst system having the at least one catalyst.

22. The method of claim 21, wherein the medium comprises a solid, a salt, an oil, or a liquid other than water.

23. The method of claim 21, wherein controlling heat transfer from the heat source to the medium for storage of thermal energy comprises controlling heat transfer to the medium during a steady state mode of the gas turbine system for later use during the startup mode and the cold period of the gas turbine system.

24. The method of claim 23, wherein controlling heat transfer from the medium to the at least one catalyst comprises controlling heat transfer from the medium to the exhaust gas upstream from the at least one catalyst during the startup mode and the cold period of the gas turbine system, and controlling heat transfer from the heat source to the medium for storage of thermal energy comprises controlling heat transfer from the exhaust gas to the medium during the steady state mode of the gas turbine system.

25. The method of claim 21, wherein the at least one storage tank comprises a cold storage tank and a hot storage tank coupled to a common heat exchanger, and the common heat exchanger is configured to transfer heat to the at least one catalyst.

26. A system, comprising:
a catalyst system having at least one catalyst to treat an exhaust gas from a gas turbine system; and
a thermal storage system having at least one storage tank to store thermal energy in a medium such that heat is available prior to a startup mode during a cold period of the gas turbine system, wherein the system is configured to transfer heat from the medium directly to the catalyst system having the at least one catalyst, and the system is configured to transfer the heat from the medium to the at least one catalyst during the startup mode and the cold period of the gas turbine system.

27. A system, comprising:
a catalyst system having at least one catalyst to treat an exhaust gas from a gas turbine system; and
a thermal storage system having at least one storage tank to store thermal energy in a medium such that heat is available prior to a startup mode during a cold period of the gas turbine system, wherein the at least one storage tank comprises a cold storage tank and a hot storage tank coupled to a common heat exchanger, the common heat exchanger is configured to transfer heat to the at least one catalyst, and the system is configured to transfer the heat from the medium to the at least one catalyst during the startup mode and the cold period of the gas turbine system.

28. A system, comprising:
a catalyst system having at least one catalyst to treat an exhaust gas from a gas turbine system; and
a thermal storage system having at least one storage tank to store thermal energy in a medium such that heat is available prior to a startup mode during a cold period of the gas turbine system, wherein the system is configured to transfer the heat from the medium to the at least one catalyst during the startup mode and the cold period of the gas turbine system, wherein the at least one storage tank is not directly associated with steam generation by a heat recovery steam generator (HRSG) and/or the thermal storage system is independent from one or more steam generating components of the HRSG.

29. The system of claim 28, comprising the HRSG configured to generate a steam by transferring heat from the exhaust gas to water.

30. The system of claim 28, wherein the at least one storage tank is not directly associated with steam generation by the HRSG, and the at least one storage tank is disposed outside of the HRSG.

31. The system of claim 28, wherein the thermal storage system is independent from the one or more steam generating components of the HRSG.

* * * * *